United States Patent
Fujimoto et al.

[15] 3,671,482
[45] June 20, 1972

[54] POLYMER SOLUTIONS OF POLYAMINO ACIDS AND THE PROCESS FOR THEIR PREPARATION

[72] Inventors: Yasuo Fujimoto, Machida-shi; Koichi Nagaoka, Tokyo; Keizo Tatsukawa, Machida-shi; Yoichi Koiwa, Tokyo, all of Japan

[73] Assignee: Kyava Hakko Kogyo Co., Ltd., Tokyo, Japan

[22] Filed: April 3, 1969

[21] Appl. No.: 813,308

[30] Foreign Application Priority Data

April 4, 1968 Japan..................................43/21788

[52] U.S. Cl. .......................260/30.4 N, 106/161, 260/30.2, 260/78 A, 264/184, 264/202
[51] Int. Cl. ..................................C08g 20/08, C08g 51/44
[58] Field of Search .................264/184, 202; 106/124, 161; 260/30.4 N, 30.2, 78 A, 34.2

[56] References Cited

UNITED STATES PATENTS

| | | | |
|---|---|---|---|
| 3,179,614 | 4/1965 | Edwards | 260/30.4 N |
| 3,344,219 | 9/1967 | Wakasa et al. | 264/202 |
| 3,387,070 | 6/1968 | Wakasa et al. | 264/202 |
| 3,447,939 | 6/1969 | Johnson | 106/161 |

*Primary Examiner*—Allan Lieberman
*Attorney*—Craig, Antonelli & Hill

[57] ABSTRACT

The present disclosure is directed to a polymer solution and a process for preparing the same which comprises a polyamino acid or polyamino acid ester and a solvent for said polymer, said solvent including at least one N-containing heterocyclic compound selected from the group consisting of:

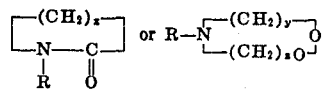

wherein $x$ is an integer of 2 to 4, $y$ and $z$ are integers, including zero, which satisfy the formula $y+z<6$, and R is hydrogen, an alkyl group having about one to eight carbon atoms, a phenyl group or a tolyl group, including those having one to three substituents selected from the group consisting of halogen and nitro.

14 Claims, No Drawings

POLYMER SOLUTIONS OF POLYAMINO ACIDS AND THE PROCESS FOR THEIR PREPARATION

The present invention relates to polymer solutions of polyamino acids and a process for preparing a solution of polyamino acids for manufacturing shaped articles. More particularly, the present invention is directed to the use of N-substituted heterocyclic compounds represented by the general formula:

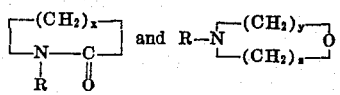

wherein x is an integer of 2 to 4, Y and Z are integers including zero and satisfying the formula of y+z<6, R is hydrogen, an alkyl group having about one to eight carbons, phenyl or tolyl group, including those having one to three substituents selected from the group consisting of halogen and nitro, as solvents for polymers of amino acid or esters thereof.

Since polyamino acids cannot be melted by heating, production of threads or films of said acids does not rely on processes such as melt spinning and melt film-forming (extrusion) but rather on dry spinning, wet spinning, dry film-forming or wet film-forming processes. However, since polyamino acids have a large free energy of molecular coagulation, they cannot be dissolved unless the solvation energy is made considerably large. Accordingly, there are few solvents for polyamino acids. For example, methylene chloride, ethylene chlorohydrin, dichloracetic acid and trifluoroacetic acid are known solvents for poly-γ-methyl-L-(or-D-or-DL-) glutamate. These compounds have a considerably large solvation energy for the poly-γ-methyl glutamate, so that the poly-γ-methyl glutamate dissociates into each solvated molecule, and the polymer is dispersed in the solvent medium by thermal motion. However, the use of these compounds is questionable from a commercial point of view because of their dissolubility with polymers, strong corrosive action, poisonous property, cost, and the like. Methylene chloride, for example, has a low dissolubility, low boiling point and is poisonous. Furthermore, a coagulating bath has to be made from compounds which are a non-solvent for the polymers of amino acids but have a strong selective affinity to the solvents of the polymer, when wet spinning or wet film-forming is applied thereto. This means that there are various limitations from a commercial point of view, when the above-mentioned solvents are used.

Polymer solutions prepared by polymerization in a suitable solvent, such as a polymer solution in ethylene- dichloride, can be directly applied to dry spinning or dry film-forming. However, commercial goods such as threads or films can hardly be produced by this method, because impurities, lower molecular weight polymers (or oligomers) and monomers which are present in the polymer solution are easily mixed into the goods.

From the foregoing, it can be concluded that a desirable solvent for dry shaping requires that it sufficiently dissolves polymers and is readily evaporated. In the case of wet shaping, a solvent for polymers has to be dissoluble with respect to the polymers and the coagulant liquid used must be a non-solvent or a non-swelling agent for the polymer and must be well miscible with the solvent used for the polymers. The coagulant liquid should be inexpensive, inflammable and not harmful to human beings because it is used in a large amount in commercial operations.

An object of the present invention is to avoid the prior art disadvantages in polymer solutions of polyamino acids and in the process of preparing said polymer solutions.

Another object of the present invention is to provide solutions of polyamino acids and a process for preparing solutions of polyamino acids for manufacturing shaped articles.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, it has been discovered that the N-substituted heterocyclic compounds represented by the formula:

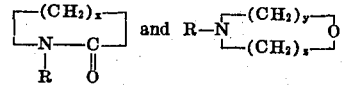

wherein R, x, y and z have the same significance as defined above, have a remarkably high dissolubility for polyamino acids, especially those having the α-helical configuration, as well as a high affinity for water. Such a property has never heretofore been known in any of the conventional solvents. These compounds can dissolve not only the polyamino acids having the α-helix and the random-coil structure but also those containing the β-structure such as in the form of stretched film or threads. Solubility of the polyamino acids in the above-mentioned solvents is greatly increased if heated and thus polyamino acids having molecular weights of about 100,000–300,000 can be dissolved at a concentration of about 5–20 percent by weight, if heated at a temperature of about 50°–100b$L$ C. The present invention is of substantial significance from a commercial point of view, particularly for wet spinning, because the present solvent has a high dissolubility for said polymers and a high affinity for water.

The polyamino acids of the present invention are polymers of said amino acids which can be shaped, such as, for example, homopolymers, polymer blends, copolymers, including block polymers and the like, of the L-, D- or DL-amino acid or acids such as the β-mono-ester of aspartic acid, the γ-monoester of glutamic acid, O-substituted serine, O-substituted threonine, alanine methionine, $N^\epsilon$-substituted lysine, $N^\delta$-substituted ornithine, $N^{guanido}$-substituted arginine, isoleucine, leucine, tyrosine, tryptophan, β-alanine, β-aminobutyric acid and the like. If functional groups such as carboxyl groups, amino groups, hydroxyl groups and mercaptan groups are needed to be protected, common organic residues of the aliphatic, aromatic or alicyclic type may be used as protective groups.

The polyamino acids which are dissolved in the above solvent, can be shaped into filamentary forms or filmy forms according to any conventional dry or wet processing procedure. One of the advantages of the present invention is that water, water-methanol, water-acetone, methanol, or acetone may be used as a coagulating bath. In the following description reference is made, by way of example, to the use of N-methyl-α-pyrrolidone (N-methyl-2-pyrrolidone), N-ethyl-α-pyrrolidone (N-ethyl-2-pyrrolidone) and morpholine as typical N-substituted heterocyclic compounds. However, said examples are merely illustrative of the present invention and accordingly, the present invention should not be limited thereto.

EXAMPLE 1

Fourteen grams of poly γ-methyl-L-glutamate, having a limiting viscosity number [η] =2.5, are dissolved in 100 ml of morpholine with stirring at 70° C. for 1 hour and filtered through a flannel filter to obtain a clear solution. The solution is defoamed (deaerated) and then extruded into water at a rate of 10 m/min. through a nozzle having an orifice of 0.1 mm to coagulate the polymer. The polymer is stretched 1.5 times, washed with water, dried and taken up on a roll to obtain filaments. The filaments have a strength (tenacity) of 3.0 g/d, an elongation of 19 percent, and a denier of 2.0.

EXAMPLE 2

Ten grams of poly-γ-methyl-L-glutamate, having a limiting viscosity number [η] = 3.0, are dissolved in 100 ml of N-methyl-2-pyrrolidone with stirring at 60° C., filtered and deaerated. The solution thus obtained is extruded into methanol through a nozzle having an orifice of 0.1 mm to coagulate the polymer. The polymer is stretched about two times, washed with methanol and dried to obtain filaments. The filaments have a strength of 3.8 g/d, an elongation of 16 percent, and a denier of 2.8.

EXAMPLE 3

Eight grams of poly-γ-ethyl-D-glutamate having a limiting viscosity number [η] = 2.1 are dissolved in 100 ml of N-methyl-2-pyrrolidone with stirring at 60° C. and filtered. The solution obtained is applied uniformly on a glass plate by a knife-coating method and heated on a hot water bath to evaporate the solvent and to obtain a clear film. The strength of the film is 210 kg/cm² and the elongation is 120 percent.

EXAMPLE 4

Seven grams of poly-γ-benzyl-L-glutamate having a limiting viscosity number [η] = 1.8 are dissolved in 100 ml of N-ethyl-2-pyrrolidone with stirring at 70° C. After filtering, the solution obtained is uniformly applied to a glass plate by a knife-coating method. The solvent was evaporated to obtain a clear film. The strength of the film is 140 kg/cm² and the elongation is 80 percent.

EXAMPLE 5

Ten grams of poly D-alanine having a limiting viscosity number [η] = 4.6 in trifluoroacetic acid are dissolved in 100 ml of N-methyl morpholine with stirring at 80° C. for 1 hour. After dissolving, the solution is filtered, deaerated and extruded into acetone at a rate of 15 m/min. through a nozzle having an orifice of 0.1 mm to coagulate the polymer.

The polymer is stretched about two times, washed with acetone, dried and taken up on a roll. The strength of the polymer is 3.9 g/d, the elongation is 7 percent, and the denier is 2.9.

EXAMPLE 6

Ten grams of a copolymer of γ-methyl-L-glutamate and γ-butyl-L-glutamate in a ratio of 80:20 respectively and having a limiting viscosity number [η] = 2.8 in dichloracetic acid are dissolved in 100 ml of 2-pyrrolidone with stirring at 70° C. for 1 hour. After filtering and deaerating, the solution thus obtained is uniformly applied on a glass plate. Acetone is sprayed thereon to coagulate the polymer, and the polymer is then washed with water and dried to obtain a film. The film has a strength of 210 kg/cm² and an elongation of 150 percent.

EXAMPLE 7

Ten grams of a copolymer of L-alanine and γ-methyl-L-glutamate in a ratio of 50:50 respectively and having a limiting viscosity number [η] = 2.7 are dissolved in 100 ml of morpholine with stirring and subsequently filtered and deaerated. The solution thus obtained is applied in a thickness of 1 mm on a non-woven nylon fabric which has been coated with an adhesive of a polymethylol adduct of lysine diisocyanate methyl ester. The fabric is then dipped in a solution of methanol and acetone in a volume ratio of 1:1, to coagulate the copolymer and washed with water and dried in air. A synthetic leather is obtained having a similar appearance and feeling as natural leather.

The invention being thus described, it will be obvious that the same may be varied in many ways. Such variations are not to be regarded as a departure from the spirit and scope of the invention and all such modifications as would be apparent to one skilled in the art are intended to be included.

What is claimed is:

1. A polymer solution which comprises a polyamino acid or a polyamino acid ester and a solvent for said polymer, said solvent consisting essentially of at least one N-containing heterocyclic compound selected from the group consisting of:

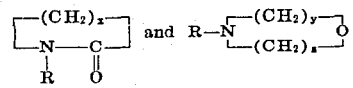

wherein $x$ is an integer of 2 to 4, $y$ and $z$ are integers, including zero, which satisfy the formula $y + z < 6$, and R is hydrogen or an alkyl group having one to four carbon atoms, the amount of polymer in said solution being sufficient to provide a satisfactory spinning or film-forming solution.

2. The polymer solution of claim 1, wherein the polymer has an α-helical configuration.

3. The polymer solution of claim 1, wherein the polyamino acids have a β-chain or a random-coil configuration.

4. The polymer solution of claim 1, wherein the polymer is are selected from the group consisting of homopolymers, copolymers, block copolymers and polymer blends of the L-, D- or DL-amino acids and esters thereof.

5. The polymer solution of claim 4, wherein the amino acids and esters thereof are selected from the group consisting of the β-monoester of aspartic acid, the γ-monoester of glutamic acid, O-substituted serine, O-substituted threonine alanine, methionine, $N^ε$-substituted lysine, $N^δ$-substituted ornithine, $N^{guanido}$-substituted arginine, isoleucine, leucine, tyrosine, tryptophan, β-alanine and β-aminobutyric acid.

6. The polymer solution of claim 1, wherein the solvent is selected from the group consisting of N-methyl-2-pyrrolidone, N-ethyl-2-pyrrolidone, 2-pyrrolidone, morpholine and N-methyl morpholine.

7. The polymer solution of claim 1, wherein the polymer is selected from the group consisting of poly-γ-methyl-glutamate, poly-γ-ethyl-glutamate, poly-γ-benzyl-glutamate, polyalanine, a copolymer of γ-methyl-glutamate and γ-butyl-glutamate and a copolymer of alanine and γ-methyl-glutamate.

8. The polymer solution of claim 1, wherein the polymer has a molecular weight of about 100,000–300,000.

9. The polymer solution of claim 1, wherein the polymer is present in an amount of about 5–20 percent by weight.

10. A polymer solution which comprises a polyamino acid or a polyamino acid ester and a solvent for said polymer consisting essentially of at least one member selected from the group consisting of:

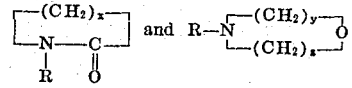

wherein $x$ is an integer of 2 to 4, and $y$ and $z$ are integers, including zero, which satisfy the formula $y + z < 6$, and R is hydrogen, methyl or ethyl, the amount of polymer is said solution being sufficient to provide a satisfactory spinning or film-forming solution.

11. The polymer solution of claim 10, wherein the solvent is selected from the group consisting of N-methyl-2-pyrrolidone, N-ethyl-2-pyrrolidone, 2-pyrrolidone, morpholine and N-methyl morpholine.

12. The polymer solution of claim 11, wherein the polymer is selected from the group consisting of poly-γ-methyl-glutamate, poly-γ-ethyl-glutamate, poly-2-benzyl-glutamate, polyalanine, a copolymer of γ-methyl-glutamate and γ-butyl-glutamate and a copolymer of alanine and γ-methyl-glutamate.

13. The polymer solution of claim 12, wherein about 5 to 20 percent by weight of said polymer is present in the solution.

14. The polymer solution of claim 13, wherein the polymer has a molecular weight of about 100,000 to 300,000.

* * * * *

UNITED STATES PATENT OFFICE
CERTIFICATE OF CORRECTION

Patent No. 3,671,482     Dated  June 20, 1972

Inventor(s) Yasuo FUJIMOTO, Koichi NAGAOKA,Keizo TATSUKAWA and
            Yoichi KOIWA It is certified that error appears in the above-identified patent
and that said Letters Patent are hereby corrected as shown below:

On the title page, line 8 should read:

--Assignee: Kyowa Hakko Kogyo Co., Ltd., Tokyo,
            Japan--

Signed and sealed this 9th day of January 1973.

(SEAL)
Attest:

EDWARD M.FLETCHER,JR.          ROBERT GOTTSCHALK
Attesting Officer              Commissioner of Patents